(12) United States Patent
Greening

(10) Patent No.: US 6,289,629 B2
(45) Date of Patent: *Sep. 18, 2001

(54) INSECT CATCHING DEVICE

(75) Inventor: John Llewellyn Greening, Bewdley (GB)

(73) Assignee: Pest West Electronics Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,796
(22) PCT Filed: Sep. 11, 1997
(86) PCT No.: PCT/GB97/02442
  § 371 Date: Mar. 11, 1999
  § 102(e) Date: Mar. 11, 1999
(87) PCT Pub. No.: WO98/10643
  PCT Pub. Date: Mar. 19, 1998

(30) Foreign Application Priority Data

Sep. 13, 1996 (GB) .................................................. 9619185

(51) Int. Cl.[7] .................................................. A01M 1/04
(52) U.S. Cl. .................................................. 43/113
(58) Field of Search .................. 43/107, 113, 119; 362/217, 260, 351, 359, 361, 248, 253

(56) References Cited

U.S. PATENT DOCUMENTS

| | | | |
|---|---|---|---|
| 2,163,272 | * | 6/1939 | Deschere .............................. 362/255 |
| 2,787,083 | * | 4/1957 | Jones .................................... 43/113 |
| 4,074,457 | * | 2/1978 | Sato et al. ............................. 43/113 |
| 4,117,624 | * | 10/1978 | Phillips ................................ 43/113 |
| 4,876,822 | * | 10/1989 | White ................................... 43/113 |
| 4,979,329 | * | 12/1990 | Olive et al. ........................... 43/113 |
| 5,143,438 | * | 9/1992 | Giddens et al. ...................... 362/84 |
| 5,165,784 | * | 11/1992 | Loth et al. ............................ 362/255 |
| 5,425,197 | * | 6/1995 | Smith .................................... 43/113 |
| 5,505,017 | * | 4/1996 | Nelson et al. ........................ 43/113 |
| 5,651,211 | * | 7/1997 | Regan et al. ......................... 43/113 |
| 5,950,355 | * | 9/1999 | Gilbert ................................. 43/113 |

FOREIGN PATENT DOCUMENTS

| | | | | |
|---|---|---|---|---|
| 2171882 | * | 9/1986 | (GB) | .................................... 43/113 |
| 2 275 409 | | 8/1994 | (GB) | ............................ A01M/1/04 |
| 35778 | * | 8/1973 | (JP) | ..................................... 43/113 |
| WO 92/20224 | | 11/1992 | (WO) | ........................... A01M/1/14 |

OTHER PUBLICATIONS

Patent Abstracts of Japan; vol. 013; No. 249; JP 01 055137 A (Mar. 2, 1989).

* cited by examiner

Primary Examiner—Charles T. Jordan
Assistant Examiner—Son T. Nguyen
(74) Attorney, Agent, or Firm—Madson & Metcalf

(57) ABSTRACT

An insect catching device having (a) a radiation source which emits a wavelength that is suitable for attracting insects, (b) a quantity of an adhesive material provided on a surface of the device on which insects impinge when attracted to the device by the radiation source, and (c) a shield for restricting direct exposure of the adhesive material to radiation from the radiation source.

21 Claims, 2 Drawing Sheets

INSECT CATCHING DEVICE

This invention relates to an insect catching device. The invention is concerned in particular with a device of the kind which comprises a source of radiation having a wavelength suitable for attracting insects to the device, and a quantity of an adhesive material provided on the surface of the device of which insects attracted to the device by the radiation source impinge.

Insect catching devices which use a radiation source to attract insects are known. The radiation will often have a wavelength in the ultraviolet region: suitable radiation sources will often emit radiation having a blue appearance. Radiation sources emitting radiation with a blue-green appearance are also known to be suitable for certain applications.

Insects attracted to such a device by a radiation source can be retained in the device by means of an adhesive material provided as a coating on a surface of the device, generally behind the radiation source. Such a device will therefore often comprise one or more tube elements from which ultra violet radiation is emitted, and an adhesive coated back plate.

Many adhesive materials which are suitable for use in such insect catching devices can be degraded when exposed to ultraviolet radiation. This leads to a reduction in the capability of such devices to retain insects within them. Frequent replacement of the adhesive material, generally on a pre-coated backplate, is required.

The present invention provides an insect catching device which includes a shield to restrict direct exposure of adhesive material in an insect catching device to insect attracting radiation.

Accordingly, in one aspect the invention provides an insect catching device which comprises:

(a) a source of radiation having a wavelength that is suitable for attracting insects, (b) a quantity of an adhesive material provided on a surface of the device on which insects attracted to the device by the radiation source impinge, and (c) a shield for restricting direct exposure of the adhesive material on the said surface to radiation from the radiation source.

The device of the present invention has been found to be capable of attracting insects to it as efficiently as devices which do not include a shield. Moreover, the presence of a shield has been found to prolong the period in which the adhesive material provided to collect insects is effective. This therefore results in greater convenience in operation of the device of the invention, and reduced operating cost.

Moreover, a shield can be used to enhance the lifetime of an adhesive insect collection material while also allowing the radiation source (such as a fluorescent tube) to be positioned close to the adhesive material to maximise insect attraction.

The radiation source used in the device of the invention will generally be provided by a fluorescent tube element. Such elements can emit radiation on a suitable wavelength for attracting insects. Such radiation would generally be ultraviolet radiation. Suitable ultraviolet radiation might have, for example, a purple appearance or a blue-green appearance. The radiation source can be provided as an elongate tubular body. The tubular body can be straight, for example to extend between connecting terminals at opposite ends thereof. The radiation source can alternatively have its connection terminals provided adjacent to one another at one end thereof, the radiation source having a generally curved configuration.

The shield will preferably extend along substantially the entire length of the body of the radiation source. For example, when the radiation source provides an elongate, generally straight, tubular body, the shield will extend along substantially the entire length of the tubular body.

The shield can be provided as a coating on the radiation source. For example, when the radiation source comprises a generally tubular body, that body can be provided with a coating, over at least a substantial part of the portion of the body which faces the adhesive coated surface of the device when in use.

A shield that is separate from the radiation source can also be used. The shield will then comprise an element that is located between the radiation source and the adhesive coated surface of the device. The element can be self supporting, so that it is sufficiently rigid to be able to retain a suitable configuration to act as a shield even when supported at only one, two or more points along its length. A suitable shield can be provided by an appropriately formed sheet of metal or other material (for example polymeric or ceramic material) having suitable shield properties.

Preferably, the shield will be constructed so that the intensity of radiation that impinges on the adhesive coated surface of the device is not more than about 80% of the level in the absence of the shield. Preferably, the intensity is not more than about 65%, especially not more than about 45%, for example, not more than about 25% of that figure.

The shield can restrict direct exposure of the adhesive material to radiation from a radiation source by, for example, absorption of the radiation or reflection. Reflection of the radiation will be particularly appropriate for many applications (although non-reflective shields can perform satisfactorily). This can be achieved by use of a reflective material for the surface of the shield which faces the radiation source. For example, when the shield is provided by a coating on the radiation source, the coating can be a metallised coating. When the shield is provided as an element located between the radiation source and the adhesive coated surface, a reflecting surface can be provided by polishing, or by an appropriate surface coating.

The adhesive material can be provided on a surface of the housing of the device. Preferably, however, the adhesive coating is provided on a sheet element which can be loaded into the device for use, and removed when its fly collecting properties have deteriorated, for example due to deterioration of the adhesive properties of the adhesive material, or due to collection of a large number of insects. The element can be received in appropriate formations such as grooves or slots in the device housing.

Suitable adhesive materials for use in the device of the invention are known, and are available widely on pre-coated sheets for insect collection.

The present invention will now be described, by way of example only, with reference to the accompanying drawings, in which.

Figure 1:
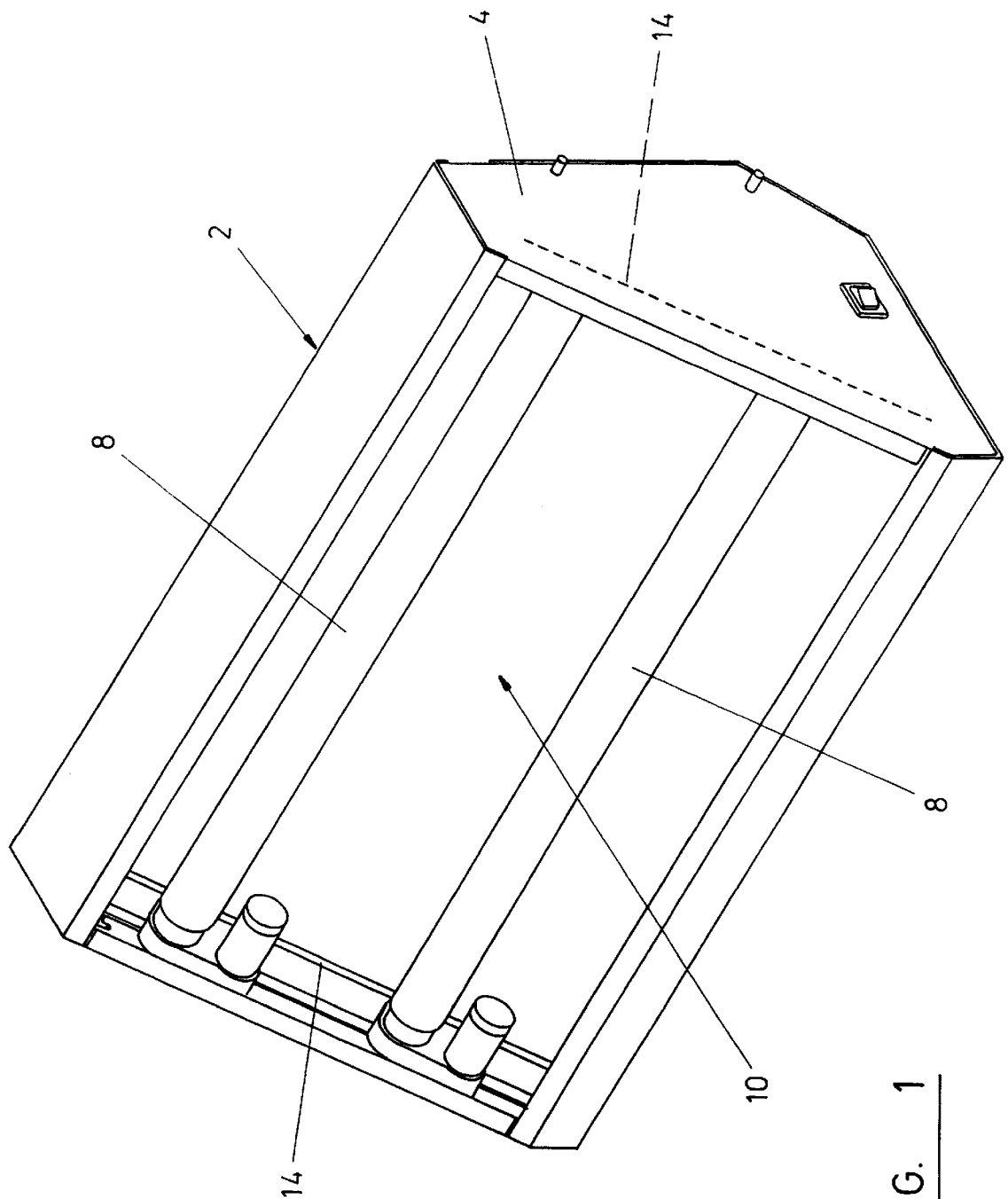
FIG. 1 is an isometric view of an insect catching device according to the present invention.
Figure 2:
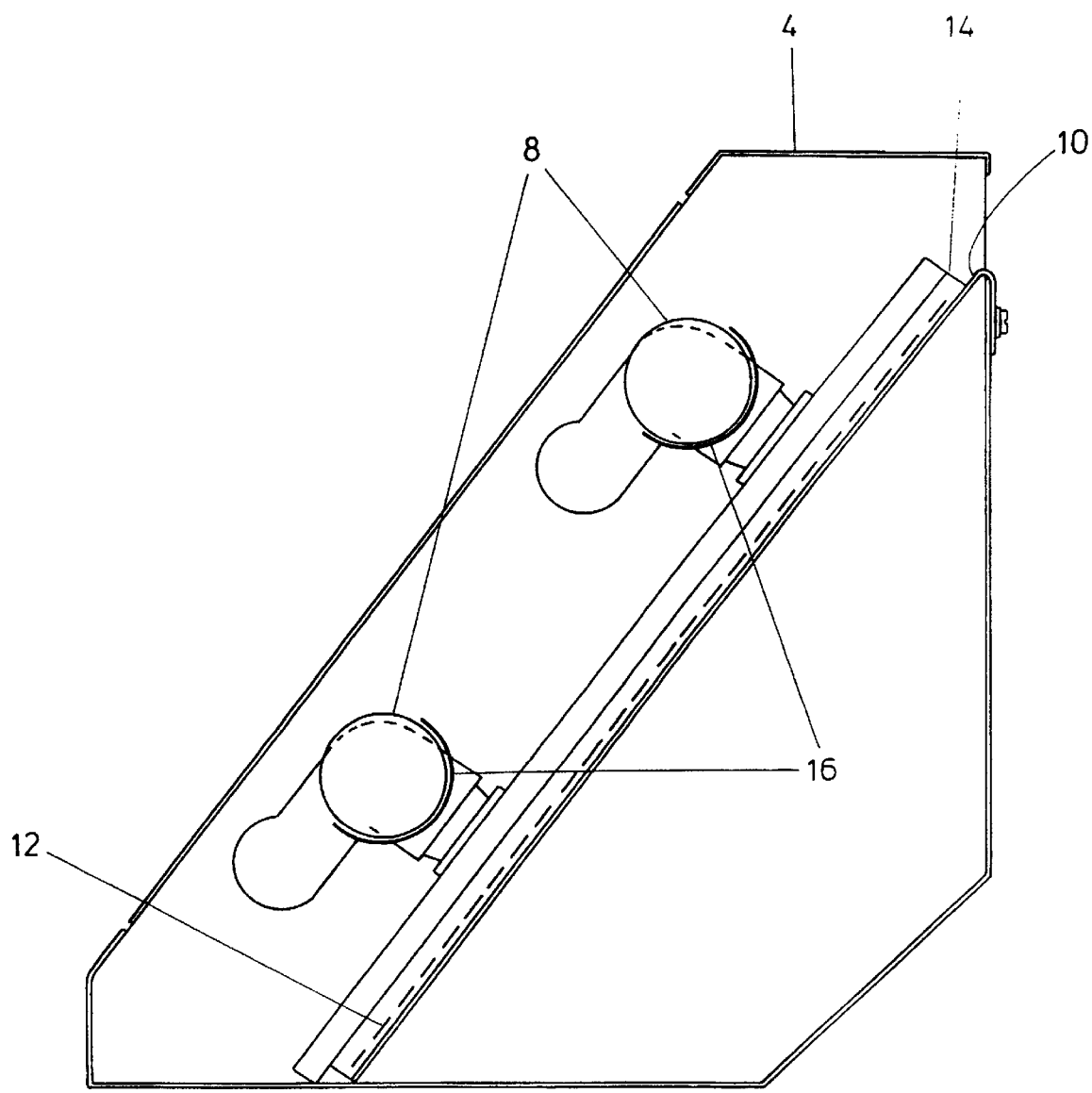
FIG. 2 is a section elevation through the device of the invention shown in FIG. 1.

Referring to the drawings, an insect catching device 2 comprises a housing 4. The housing is open over a front face, which is covered by a grill, which is not shown in the drawings for the sake of clarity.

A plurality of radiation emitting fluorescent tubes 8 are located in the housing. The tubes are straight, extending from one side of the housing to the other.

The rear internal surface 10 of the housing is covered by a removable sheet element 12, having an adhesive material over its exposed surface facing towards the radiation source tubes and the grill. The adhesive coated sheet can be slid into the housing through a slot in the top face of the housing, received in appropriate vertical grooves 14 at each end of the housing.

Separate shields 16 are provided between each of the fluorescent tubes and the adhesive coated surface. The shields are formed from aluminum. The surface of the shields which faces towards the tubes can be polished so that radiation from the tubes is reflected by the shield away from the adhesive coated surface. The shields are concave when viewed along the axis of the radiation source tubes. The shields restrict exposure of the adhesive coated surface to radiation from the radiation source tubes.

In use, insects are attracted to the device by radiation from the radiation source tubes. Such insects pass the tubes and impinge on the adhesive coated surface. They are retained on the surface by the adhesive.

The shields provided between the radiation source tubes and the adhesive coated surface restrict exposure of the surface to radiation. This restricts degradation of the adhesive material which would otherwise result from its exposure to ultraviolet radiation.

What is claimed is:

1. An insect catching device which comprises:
   (a) a source of radiation having a wavelength that is suitable for attracting insects, in the form of an elongate tube,
   (b) a quantity of an adhesive material provided on a surface of the device on which insects attracted to the device by the radiation source impinge, and
   (c) a shield which is concave when viewed from one end which is a coating on the tubular radiation source, for restricting direct exposure of the adhesive material on the said surface to radiation from the radiation source, such that the radiation exposure on the adhesive is less than 80% of the radiation exposure in the absence of said shield.

2. A device as claimed in claim 1, in which the radiation source comprises at least one elongate tubular body, and in which the shield extends along at least a substantial part of the length of the body.

3. A device as claimed in claim 2, in which the shield is located between the radiation source and the adhesive coated surface.

4. A device as claimed in claim 3, in which the shield is self supporting, so that it is sufficiently rigid to be able to retain a suitable configuration to act as a shield even when supported at only one or two points along its length.

5. A device as claimed in claim 4, in which the surface of the shield that faces towards the radiation source is reflective.

6. A device as claimed in claim 1, in which the shield is located between the radiation source and the adhesive coated surface.

7. A device as claimed in claim 6, in which the shield is self supporting, so that it is sufficiently rigid to be able to retain a suitable configuration to act as a shield even when supported at only one or two points along its length.

8. A device as claimed in claim 1, in which the surface of the shield that faces towards the radiation source is reflective.

9. A device as claimed in claim 1, wherein the radiation exposure on the adhesive is less than 65% of the radiation exposure in the absence of the shield.

10. A device as claimed in claim 1, wherein the radiation exposure on the adhesive is less than 45% of the radiation exposure in the absence of the shield.

11. A device as claimed in claim 1, wherein the radiation exposure on the adhesive is less than 25% of the radiation exposure in the absence of the shield.

12. An insect catching device comprising:
    at least one source of radiation having a wavelength that is suitable for attracting insects in the form of an elongate tube;
    a quantity of an adhesive material provided on a surface of the device on which insects attracted to the device by the radiation source impinge; and
    a shield which is concave when viewed from one end for restricting direct exposure of the adhesive material to radiation from the radiation source, such that the radiation exposure on the adhesive is less than 80% of the radiation exposure in the absence of said shield, said shield having substantially the same diameter as the outer diameter of said source of radiation.

13. A device as claimed in claim 12, wherein said shield is a semi-cylindrical trough and is configured to have an arc angle of approximately 180 degrees and wherein said shield is sized and configured to be fitted onto, and cover a substantial length of, said source of radiation.

14. A device as claimed in claim 13, wherein said shield is self supporting, such that it is sufficiently rigid to be able to retain a suitable configuration to act as a shield even when supported at only one or two points along its length.

15. A device as claimed in claim 13, wherein said shield has a reflective surface facing toward said source of radiation and away from said adhesive material.

16. A device as claimed in claim 12, wherein said shield is metal.

17. A device as claimed in claim 16, wherein said shield is aluminum.

18. A device as claimed in claim 12, wherein said shield is polymeric.

19. A device as claimed in claim 12, wherein said shield is ceramic.

20. A device as claimed in claim 12, wherein said shield is a semi-cylindrical trough having an arc angle of approximately 180 degrees and a diameter substantially the same as the outer diameter of a tubular radiation source, whereby said shield is fitted onto, and covers a substantial length of said radiation source; said shield further being rigid such that it can retain a suitable configuration when supported at only one or two locations along its length.

21. A device as claimed in claim 20, wherein said shield is aluminum.

* * * * *